Aug. 1, 1961   M. TRIEF ET AL   2,994,255
SAFETY BARRIER FOR ROADS
Filed Sept. 11, 1957   2 Sheets-Sheet 1

INVENTORS:
MARCEL TRIEF AND
LÉON TRIEF

BY Robert H. Jacob
AGENT

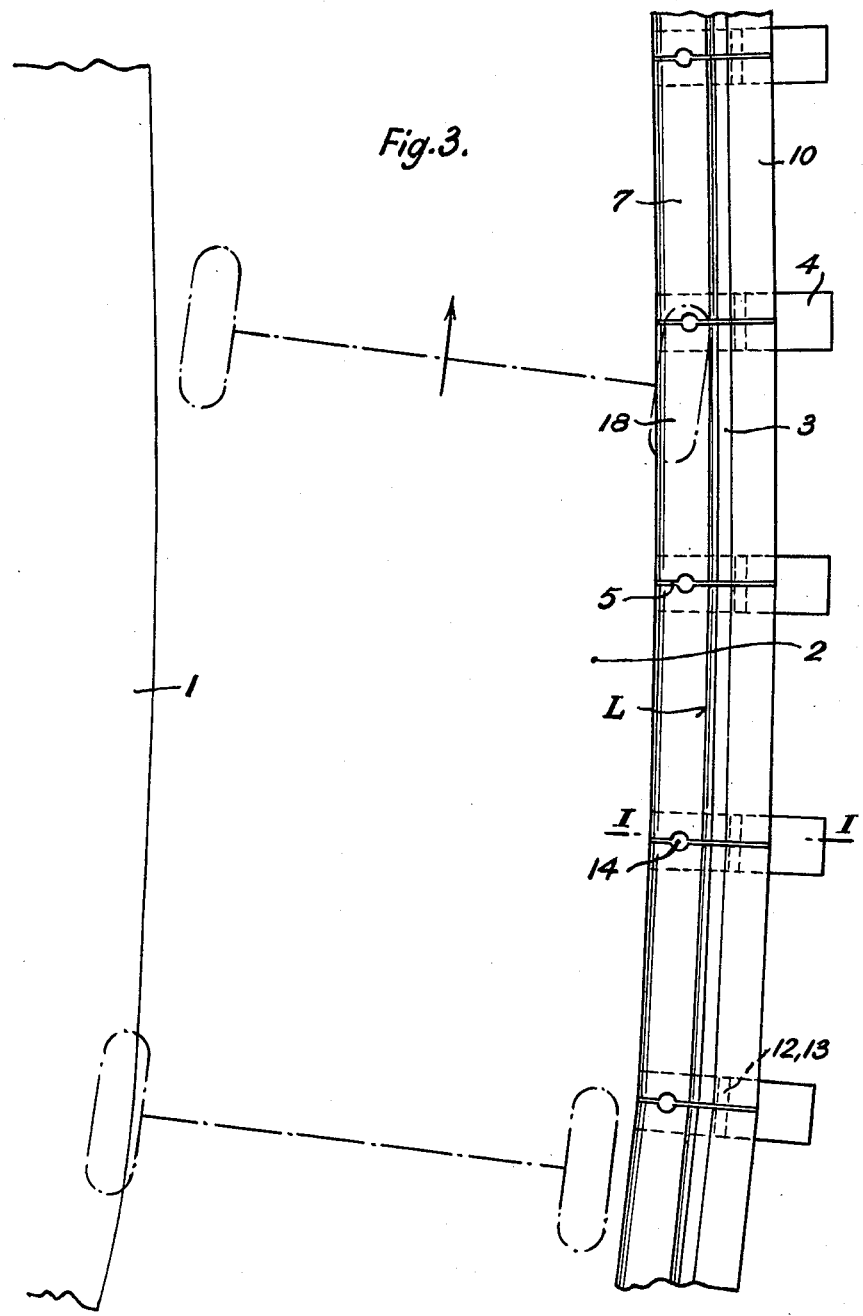

United States Patent Office 2,994,255
Patented Aug. 1, 1961

2,994,255
SAFETY BARRIER FOR ROADS
Marcel Trief, 8 rue Kalenberg, Dilbeek, Belgium, and Leon Trief, 41 rue Marie-Therese, St. Josse-Ten-Noode, Belgium
Filed Sept. 11, 1957, Ser. No. 683,258
Claims priority, application Belgium Sept. 15, 1956
4 Claims. (Cl. 94—31)

There are various systems of safety barriers for roads, which are disposed along the edge of the latter, and have the object of returning to the road a vehicle which tends to leave it, automatically straightening and braking the wheel which strikes the barrier, and preventing the wheel from mounting the latter. Known barriers are generally complicated and costly in construction or installation, more particularly because they comprise a continuous wall mounted at a certain distance above the ground on posts disposed, for example, in the earth path which generally runs along the concrete road. Thus the distance of the wall above the ground does not remain constant, especially on curves, thereby detracting from the effectiveness of the barrier which is calculated to act in a predetermined zone above the base of the wheel on the tire by way of the lower edge of the wall. In addition, it will be understood that the tire is liable to be severely damaged because it is subjected to heavy braking by a fixed wall at an acute angle.

Furthermore most of the safety barriers cannot act as wheel-deflectors and are certainly not suitable for straightening the wheel. Because of the height of the barriers, the bumper and mud guard of the vehicle touch the barrier wall before the wheel and are forced inwards against the tire before the barrier can straighten the wheel.

The maximum height of the wheel-deflector member is therefore an essential element. The bumper and mudguard must, in fact, be able to pass above the upper edge of the surface which acts as the wheel-deflector in order to allow the said surface to straighten the wheel without the wheel being able to climb up the wheel-deflector. The wheel-deflector must brake the wheel after having straightened it.

The object of the invention is to employ a safety barrier which remains fully effective in spite of surface irregularities of the path, accurately straightens the wheel which strikes it, and heavily brakes the wheel once it has been straightened with virtually no damage to the tire or wheel. The invention also relates to the embodiment of such a barrier which is economical in construction and simple to place in position.

To this end, the invention provides for a barrier consisting of profiled pieces of concrete or the like, resting on spaced supports in slab form disposed in the ground, the said profiled pieces having an inclined surface, generally a plane, merging into the roadway and rising towards the exterior preferably at a gradient of approximately 40% (angle of approximately 22°). The inclined surface merges into a portion extending upwards and forming the wheel-deflector which has a convex surface directed towards the road. The portion of the said wheel-deflector which projects to the greatest extent towards the road is disposed at a suitable height above the said surface to come into contact with the side of the tire on a vehicle wheel which encounters the barrier.

In accordance with a feature of the invention, the upper edge of the portion which acts as the wheel-deflector is disposed at such a height that the bumper and mudguard of a normal vehicle can pass above the said edge.

The said inclined surface ensures that the wheel is straightened before coming into contact with the said convex portion which forms the wheel-deflector and exerts a braking effect, so that if the wheel still has not been completely straightened at the moment when it comes into contact with the wheel deflector the angle which it forms with the latter will be reduced and the perpendicular component of the force exerted will be small.

Braking is most effective because it occurs relatively high up on the tire in consequence of the rounded convex shape of the wheel-deflector, which has no acute angle coming into contact with the tire. In addition, the lower portion of the tire is effectively held in the hollow disposed below the line of maximum projection of the wheel-deflector towards the road. Furthermore, the said inclined surface which the wheel encounters in the first place imparts a favourable inclination to the vehicle, reducing the force of impact against the barrier, counterbalancing centrifugal force, and preventing the wheel from climbing up the barrier.

The safety barrier according to the invention might be combined with a guard-rail which would extend above the wheel-deflector and would be disposed further out from the road than the latter.

Other features and advantages of the invention will be apparent from the description of a constructional example which will be given hereinafter with reference to the attached drawing, wherein:

FIGURE 3 is a diagrammatic plan view showing the wheels of a vehicle, one of which is coming into contact with the barrier on a curve.

Figure 1:
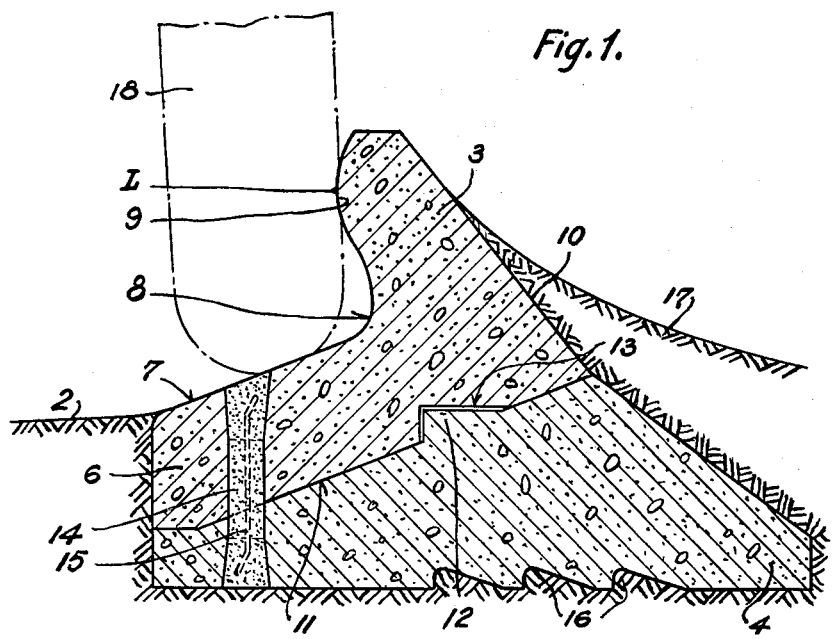
FIGURE 1 is a vertical section through a safety barrier according to the invention in the position in which the wheel-deflector rests on a support disposed in the ground.
Figure 2:
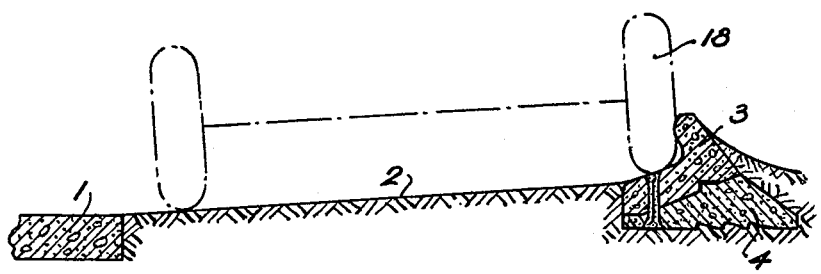
FIGURE 2 is a diagrammatic vertical section showing a vehicle wheel which has left the road and has been straightened by the barrier.

The drawings show a safety barrier disposed along a road 1 consisting of concrete or other material, and separated from the latter by a path 2, consisting for example of earth. The barrier consists of profiled pieces 3 of concrete or the like, each forming a girder which simply rests by way of its end on supports 4 in slab form, the said girders being separated by joints 5 which may be made in any suitable fashion.

The pieces 3 comprise a seating portion 6 intended to bear on a support 4 and having an upwardly and outwardly inclined upper surface 7 which is generally plane, the said seating portion being engaged in the ground in such a manner that the surface 7 merges into the surface of the path 2 which will preferably rise as much as possible towards the exterior. The inclined surface 7 preferably terminates in a rounded edge on the side of the path 2. The portion of the piece 3 situated above the surface 7 has, on the side disposed towards the road, a profile preferably comprising a concave portion 8 which merges on the one hand into the surface 7 and on the other hand into an upper convex portion 9 which forms the wheel-deflector as such. The back 10 of the piece 3 is downwardly and rearwardly inclined in order to give the piece a shape having high resistance in proportion to its weight.

The base of the seating portion 6 and the upper face of the supports 4 have a shape which both allows them to be placed in position correctly and imparts great resistance to horizontal thrust towards the exterior of the road. As shown in FIGURE 1, this double effect can be achieved if the adjacent surfaces of the pieces 3 and 4 comprise an upwardly and outwardly inclined portion 11 and at least one external portion which is horizontal or has a different inclination. The said adjacent surfaces can also have an interlock in the form of a step and which may have a certain degree of play, as shown, for example, at 12, 13, the inclined portion of the support 4 thus having a check abutment for the piece 3 when the latter tends to be forced outwards. The step 12 may extend over the whole width of the piece 4, while the cavities 13 may be limited to the ends of the pieces 3.

If it is desired to anchor the pieces 3 positively to the supports 4, the latter may be provided with a vertical aperture which will coincide with hollows provided in the end faces of the pieces 3 in order to form a cavity 14 in the position of the joints 5, the said cavity being for example of circular cross-section, being filled with mortar or the like, and being capable of containing a reinforcement iron 15.

Moreover, hollows 16 in the form of teeth may be provided in the base of the supports 4 in order to obtain better grip in the ground. The earth 17 outside the barrier may cover at least part of the inclined surface 10 in order to make the structure more stable.

When a vehicle wheel 18 moves towards the safety barrier, it first runs on to the inclined plane which at least partially straightens it, the wheel exerting downward pressure on the surface 7 in such a manner as to apply the piece 3 firmly against its supports 4. The wheel is therefore already partially or completely straightened when it comes into contact with the wheel-deflector formed by the convex portion 9, and this reduces the force of impact. At this moment the wheel starts to be very heavily braked, the dimensions of the barrier being so chosen that braking always occurs over a relatively wide zone of the tire, generally between 12 and 20 cm. above the inclined plane 7 for a range of wheels of different dimensions. This result is obtained because a rounded convex surface of the barrier acts on the tire, so that braking, although very heavy, does not damage the tire. The braking action is independent of surface irregularities in the path 2, since the wheel is disposed at this moment on the inclined plane 7.

In addition, the tire is effectively held by the portion of the wheel-deflector situated under the line L of maximum projection of the convex portion 9 towards the road.

The supports 4 are pieces which are easy to manufacture, manipulate and place in position, just as are the wheel-deflector elements 3, which can be simply placed on the supports 4, and can be relatively short, for example of the order of 1 metre in length. In this way, the curves can even be made of straight elements, since the centre angle for such elements is less than 2° for a radius of curvature of 30 m. In order to produce regular joints on curves, it is sufficient to make the elements of slightly trapezoid horizontal section, measuring, for example, 1 m. outside and approximately 0.985 m. inside.

It may be stated purely by way of example that the part of the barrier situated above the path 2 may, for example, be of the order of 30 cm. high, the inclined plane 7 advantageously having a gradient of the order of 40 to 50% (angle of approximately 20 to 25°), while the line L is advantageously disposed approximately 20 cm. vertically above the middle portion of the plane 7.

An interesting possibility resides in the fact that the path 2 need not necessarily be level with the edge of the inclined plane 7, as shown in FIGURE 1, but could partially cover the latter, or even be disposed at a slightly lower level, in which case the angle of the seating portion 6 would form a projecting curb taking the form of a first wheel-deflector.

Since placing in position on the supports 4 is easy, and the said supports are not expensive, shorter wheel-deflector elements can be used than is economically permissible when the wheel-deflector is mounted on small posts.

The elements of the barrier may be made of any suitable material. Their shape more particularly allows them to be made of non-reinforced concrete, which is economical, and allows them to be made of very dense and more weather-resisting concrete.

Since only the wheel-deflector protrudes from the ground, it will be understood that the appearance is more attractive than if it were mounted on small posts.

It goes without saying that the invention is not limited to the constructional example described and illustrated, to which various modifications may be made without departing from the spirit of the invention.

What we claim is:

1. A safety barrier in roads comprising a plurality of profiled pieces of concrete or the like mounted upon spaced supporting blocks of concrete or the like, said blocks extending outwardly from under said pieces, said pieces each comprising on the top side thereof a first inclined plane surface and a convex surface separated by a concave surface, said first inclined plane surface merging into the roadway and extending upward and away therefrom at an angle of approximately 20–25 degrees with the roadway into said concave surface, said convex surface extending upward from said concave surface toward the road and overhanging and spaced from a part of said first inclined plane surface, to engage the tire of a vehicle which encounters the barrier, the bottom side of each of said pieces comprising a second inclined surface extending upward and away from the roadway and provided with a notch, each of said blocks comprising an inclined surface corresponding to said second inclined surface of said pieces for engaging and supporting said pieces, and means comprising a step formed in said inclined surface of each of said blocks, said step providing a shoulder for fitting into said notch provided in said second inclined surface of a cooperating profiled piece to resist outward movement of said pieces.

2. A safety barrier in roads comprising a plurality of profiled pieces of concrete or the like mounted upon spaced supporting blocks of concrete or the like, said blocks extending outwardly from under said pieces, said pieces each comprising on the top side thereof a first inclined surface and a convex surface separated by a concave surface, said first inclined surface merging into the roadway and extending upward and away therefrom at an acute angle of elevation with the roadway into said concave surface, said convex surface extending upward from said concave surface toward the road and overhanging and spaced from a part of said first inclined surface to engage the tire of a vehicle which encounters the barrier, the bottom side of each of said pieces comprising a second inclined surface extending upward and away from the roadway and provided with a notch, each of said blocks comprising an inclined surface corresponding to said second inclined surface of said pieces for engaging and supporting said pieces, and means comprising a step formed in said inclined surface of each of said blocks, said step providing a shoulder for fitting into said notch provided in said second inclined surface of a cooperating profiled piece to resist outward movement of said pieces.

3. A safety barrier in roads comprising a plurality of profiled pieces of concrete or the like mounted upon spaced supporting blocks of concrete or the like, said blocks extending outwardly from under said pieces, said pieces each comprising on the top side thereof a first inclined surface and a convex surface separated by a concave surface, said first inclined surface merging into the roadway and extending upward and away therefrom at an acute angle of elevation with the roadway into said concave surface, said convex surface extending upward from said concave surface toward the road and overhanging and spaced from a part of said first inclined surface to engage the tire of a vehicle which encounters the barrier, said pieces comprising a second inclined surface extending downwardly and outwardly from the upper end of said convex portion and being covered with earth over at least a part of said second inclined surface, the bottom side of each of said pieces comprising a third inclined surface extending upward and away from the roadway and provided with a notch, each of said blocks comprising an inclined surface corresponding to said third inclined surface of said pieces for engaging and supporting said pieces, and means comprising a step formed in said inclined surface of each of said blocks, said step providing a shoulder for fitting into said notch provided in said third inclined surface of a cooperating profiled piece to resist outward movement of said pieces.

4. A safety barrier in roads comprising a plurality of profiled pieces of concrete or the like mounted upon spaced supporting blocks of concrete or the like, said blocks extending outwardly from under said pieces, said pieces each comprising on the top side thereof a first inclined surface and a convex surface separated by a concave surface, said first inclined surface merging into the roadway and extending upward and away therefrom at an anlge of approximately 20–25 degrees with the roadway into said concave surface, said convex surface extending upward from said concave surface toward the road and overhanging and spaced from a part of said first inclined surface to engage the tire of a vehicle which encounters the barrier, the bottom side of each of said pieces comprising a second inclined surface extending upward and away from the roadway and provided with a notch, each of said blocks comprising an inclined surface corresponding to said second inclined surface of said pieces for engaging and supporting said pieces, and means comprisnig a step formed in said inclined surface of each of said blocks, said step providing a shoulder for fitting into said notch provided in said second inclined surface of a cooperating profiled piece to resist outward movement of said pieces.

References Cited in the file of this patent

UNITED STATES PATENTS

| | | |
|---|---|---|
| 392,277 | Loy | Nov. 6, 1888 |
| 881,747 | Townsend | Mar. 10, 1908 |
| 1,456,080 | Trebes | May 22, 1923 |
| 1,927,189 | Sory | Sept. 19, 1933 |
| 2,011,531 | Tranchell | Aug. 13, 1935 |
| 2,153,392 | Robertson | Apr. 4, 1939 |
| 2,249,979 | Reardon | July 22, 1941 |
| 2,316,660 | Bailey | Apr. 13, 1943 |
| 2,653,450 | Fort | Sept. 29, 1953 |

FOREIGN PATENTS

| | | |
|---|---|---|
| 1,188 | Australia | Mar. 26, 1926 |
| 683,336 | Great Britain | 1952 |
| 506,250 | Italy | 1954 |
| 78,878 | Denmark | 1955 |
| 24,334 | Germany | Sept. 13, 1956 |